J. H. BALDERSTON.
Bread-Workers.

No. 135,959.      Patented Feb. 18, 1873.

Witnesses:

Inventor:

UNITED STATES PATENT OFFICE.

JOSEPH H. BALDERSTON, OF COLORA, MARYLAND.

IMPROVEMENT IN BREAD-WORKERS.

Specification forming part of Letters Patent No. 135,959, dated February 18, 1873.

*To all whom it may concern:*

Figure 1:
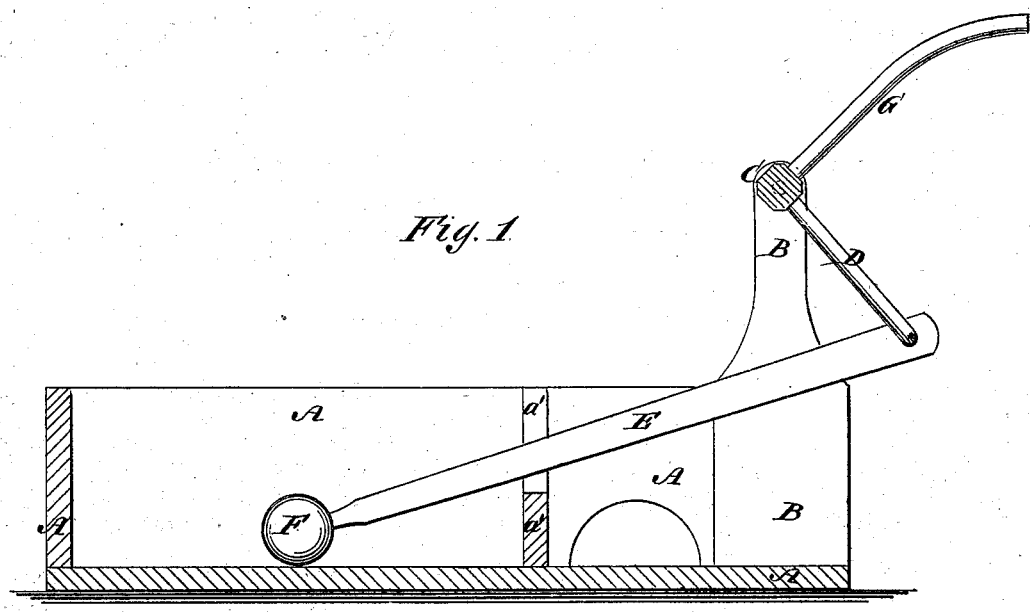
Figure 2:
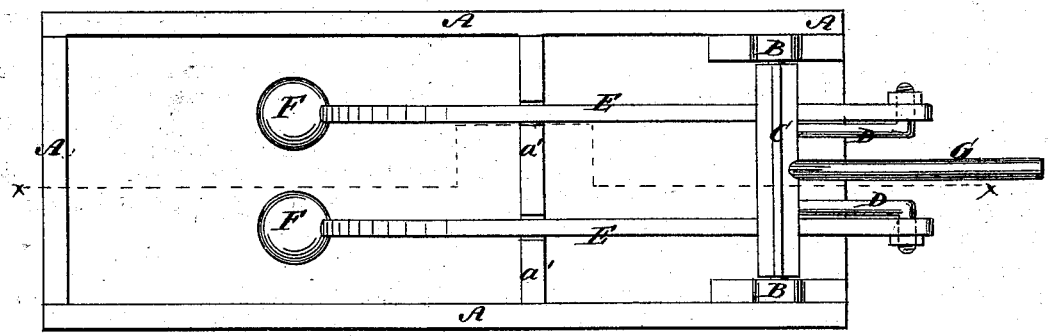

Be it known that I, JOSEPH H. BALDERSTON, of Colora, in the county of Cecil and State of Maryland, have invented a new and useful Improvement in Bread-Workers, of which the following is a specification:

Figure 1 is a detail vertical longitudinal section of my improved machine, taken through the line $x\ x$, Fig. 2. Fig. 2 is a top view of the same.

Similar letters of reference indicate corresponding parts.

My invention has for its object to furnish a simple, inexpensive, durable, convenient, and effective machine for working or kneading bread. The invention consists in an improved dough-worker, formed by the combination of the standards, shaft, arms, bars, balls, and lever with each other and with the slotted partition and the box, as hereinafter more fully described.

A is a box, which is made open at one end, and which is divided into two unequal compartments by a partition, $a'$. To the sides of the box A, at the open end of the box, are attached standards B, to the upper ends of which is pivoted a shaft, C. To the shaft C are attached two downwardly-projecting arms, D. To the lower ends of the arms D are pivoted the ends of the bars E, which pass through slots or notches in the partition $a'$, which thus serves as guides to the said bars E. To the free ends of the bars E are attached balls F, as shown in Figs. 1 and 2. To the shaft C is attached a lever, G, projecting outward at right angles, or nearly at right angles, with the arms D.

In using the machine the bread, mixed to the proper consistency for working or kneading, is placed in the closed end of the box A. The lever G is then moved up and down, which projects the balls F against the dough, and withdraws them from it. The effect of this is to cause the dough to revolve toward said balls, so that by continuing the operation a short time the dough will be thoroughly worked.

Having thus described my invention, I claim as new and desire to secure by Letters Patent—

An improved dough-worker, formed by the combination of the standards B, shaft C, arms D, bars E, balls F, and lever G, with each other and with the slotted partition $a'$ and box A, substantially as herein shown and described.

JOSEPH H. BALDERSTON.

Witnesses:
   THOS. WARING,
   STREET BROWN.